(12) United States Patent
Djadi et al.

(10) Patent No.: US 6,661,891 B1
(45) Date of Patent: Dec. 9, 2003

(54) METHOD AND APPARATUS FOR DETECTING AN ACTIVATION TONE

(75) Inventors: Younes Djadi, Austin, TX (US); Vijayakumaran V. Nair, Austin, TX (US); Yan Zhou, Austin, TX (US)

(73) Assignee: Legerity Inc., Austin, TX (US)

( * ) Notice: Subject to any disclaimer, the term of this patent is extended or adjusted under 35 U.S.C. 154(b) by 0 days.

(21) Appl. No.: 09/498,435

(22) Filed: Feb. 4, 2000

(51) Int. Cl.[7] .................. H04M 1/00; H04M 3/00; H04M 9/00; H04M 9/08
(52) U.S. Cl. ............ 379/386; 379/399.01; 379/412.02; 379/418
(58) Field of Search .................. 379/156, 163, 379/165, 167.01, 399.01, 399.02, 419.02, 413.02, 418

(56) References Cited

U.S. PATENT DOCUMENTS 4,112,261 A * 9/1978 Shiff ........................ 379/162
5,151,896 A * 9/1992 Bowman et al. .......... 370/401
6,072,794 A * 6/2000 Kang ........................ 370/352

* cited by examiner

*Primary Examiner*—Binh Tieu
(74) *Attorney, Agent, or Firm*—Williams, Morgan & Amerson, P.C.

(57) ABSTRACT

A line card for interfacing with a plurality of subscriber lines includes a plurality of data processors and a tone detector. Each of the data processors is associated with one of the subscriber lines. The tone detector is adapted to detect one of a plurality of activation tones on a selected subscriber line. The plurality of activation tones include a first activation tone having an active portion and a silent portion. The active and silent portions repeat periodically at a first frequency having a first period. A second activation tone has a phase reversal portion repeating at a second frequency and having a second period. The tone detector is further adapted to sequence between the subscriber lines at a predetermined interval. The predetermined interval is based on the first and second periods. The tone detector is adapted to signal the data processor associated with the selected subscriber line in response to detecting one of the activation tones.

24 Claims, 3 Drawing Sheets

METHOD AND APPARATUS FOR DETECTING AN ACTIVATION TONE

BACKGROUND OF THE INVENTION

1. Field of the Invention

This invention relates generally to signal detection, and, more particularly, to a method and apparatus for detecting an activation tone.

2. Description of the Related Art

In communications systems, particularly telephony, it is common practice to transmit signals between a subscriber station and a central switching office via a two-wire, bi-directional communication channel. The Plain Old Telephone System (POTS), designed primarily for voice communication, provides an inadequate data transmission rate for many modem applications. To meet the demand for high-speed communications, designers have sought innovative and cost-effective solutions that take advantage of the existing network infrastructure. Several technological advancements have been proposed in the telecommunications industry that make use of the existing network of telephone wires. One of these technologies is the XDSL technology. DSL technology uses the existing network of telephone lines for broadband communications. An ordinary twisted pair equipped with DSL interfaces can transmit videos, television, and high-speed data.

DSL systems use digital signal processing (DSP) to increase throughput and signal quality through common copper telephone wire. Certain DSL systems provide a downstream data transfer rate from the DSL Point-of-Presence (POP) to the subscriber location at speeds of about 1.5 Megabits per second (MBPS) up to 8 MBPS. The transfer rate of 1.5 MBPS, for instance, is fifty times faster than a conventional 28.8 kilobits per second (KBPS) transfer rate. One popular version of the DSL technology is the Asymmetrical Digital Subscriber Line (ADSL) technology. The full bandwidth ADSL standard is described in ANSI T1.413 Issue 2, entitled, "Interface Between Networks and Customer Installation—Asymmetric Digital Subscriber Line (ADSL) Metallic Interface." The lower bandwidth standard, commonly referred to as G.Lite, is described in "ITU-T Recommendation G.992.2 (June 1999)—Splitterless Asymmetric Digital Subscriber Line (ADSL) transceivers."

Both T1.413 and G.Lite protocols initiate connections by sending an activation tone to the called station. The G.Lite protocol also provides for a fast retrain tone that can be sent to force a retraining of the connection. A line card at the called station detects the activation and/or retrain tones. Typically, a line card services a plurality of subscriber local loop circuits, commonly referred to as subscriber lines. The line card has interface circuitry for each line that samples the analog signal to create a digital line signal. Each subscriber line has an associated data digital signal processor (DDSP) that detects the presence of one or more of the activation and/or retrain tones. In response to receiving one of the tones, the line card establishes a data connection in accordance with the appropriate protocol.

In a typical line card serving eight subscriber lines, it is common for only one of the subscriber lines to be active with a data connection. However, even if a connection is idle, the associated DDSP and supporting circuitry are active to allow detection of activation and/or retrain tones. This significantly adds to the power load of the line card and to the amount of heat it generates. Tone detection generally results in a relatively light computational load as compared to the computational resources required to support an active G.lite or T1.413 data connection.

In accordance with industry standards, a T1.413 activation tone is a single tone at frequency bin 8 (i.e., each bin is 4.3125 kHz) with a transmit power of −3.65 dbm for the first 64 symbols (i.e., each symbol=1/4.3125 ms) and 24 db lower for the second 64 symbols. The second 64 symbols are followed by 896 silent symbols. A G.lite activation tone consists of three simultaneous tones at bins 9, 17, and 25 with phase reversals every 16 ms. The G.lite retrain tone is a single tone at bin 20 with phase reversals every 16 ms.

The phase reversals and varied transmit power characteristics of the activation tones complicate the task of tone detection. During the phase reversal periods, the energy significantly decreases using a filter based energy detection method. If the energy of the answering tone signal is polled near or during one of the phase reversals, detection of the answering tone could be missed. If the detection threshold for detecting the answering tone is lowered to account for the possibility of polling during the phase reversal, the likelihood of a false positive detection is increased. Threshold determination is also difficult with the T1.413 activation tone due to the varied transmit power.

The present invention is directed to overcoming, or at least reducing the effects of, one or more of the problems set forth above.

SUMMARY OF THE INVENTION

One aspect of the present invention is seen in a line card for interfacing with a plurality of subscriber lines. The line card includes a plurality of data processors and a tone detector. Each of the data processors is associated with one of the subscriber lines. The tone detector is adapted to detect one of a plurality of activation tones on a selected subscriber line. The plurality of activation tones include a first activation tone having an active portion and a silent portion. The active and silent portions repeat periodically at a first frequency having a first period. A second activation tone has a phase reversal portion repeating at a second frequency and having a second period. The tone detector is further adapted to sequence between the subscriber lines at a predetermined interval. The predetermined interval is based on the first and second periods. The tone detector is adapted to signal the data processor associated with the selected subscriber line in response to detecting one of the activation tones.

Another aspect of the present invention is seen in a method for detecting activation tones on a plurality of subscriber lines. The method includes providing a plurality of data processors. Each of the data processors is associated with one of the subscriber lines. One of a plurality of activation tones is detected on a selected subscriber line. The plurality of activation tones includes a first activation tone having an active portion and a silent portion, the active and silent portions repeating periodically at a first frequency having a first period. A second activation tone has a phase reversal portion repeating at a second frequency having a second period. The subscriber lines are sequenced between at a predetermined interval, the predetermined interval being based on the first and second periods. The data processor associated with the selected subscriber line is signaled in response to detecting one of the activation tones.

BRIEF DESCRIPTION OF THE DRAWINGS

The invention may be understood by reference to the following description taken in conjunction with the accompanying drawings, in which like reference numerals identify like elements, and in which.

Figure 1:
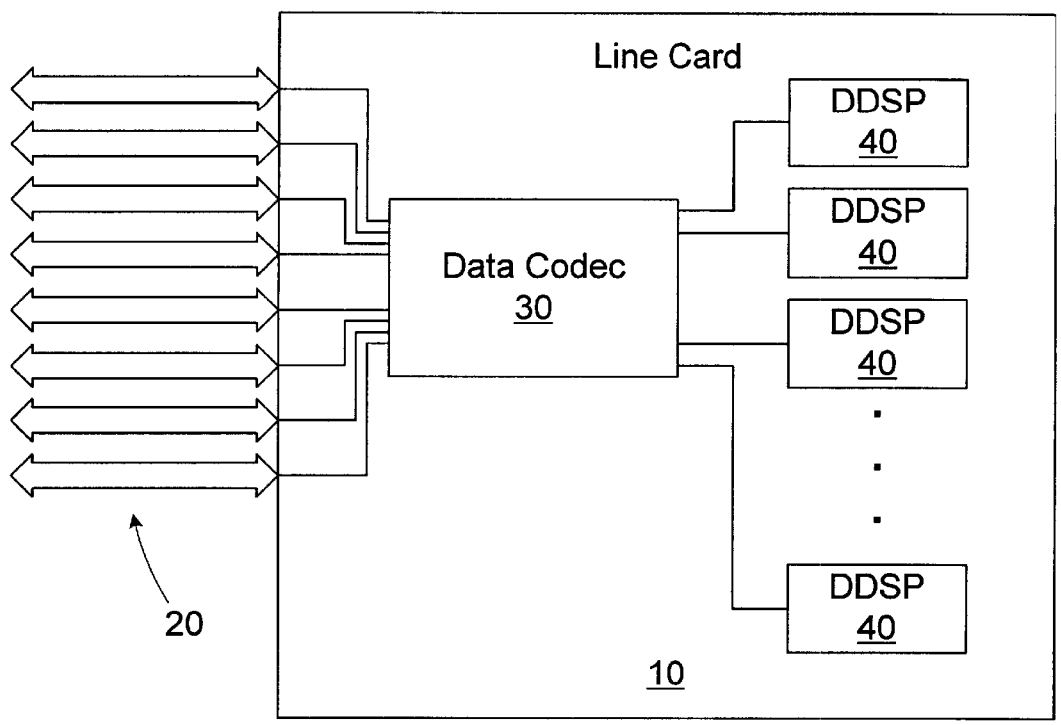
FIG. 1 is a simplified block diagram of a line card in accordance with the present invention used for monitoring subscriber lines in a central office.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring first to FIG. 1, a simplified block diagram of a line card 10 in accordance with the present invention is shown. The line card 10 is used for monitoring a plurality of subscriber lines 20 in a central office (not shown). The line card 10 includes a data coder/decoder (codec) 30 coupled to the subscriber lines 20. In the illustrated embodiment, eight subscriber lines 20 are shown. However, in an actual embodiment, the specific number of subscriber lines 20 may be higher or lower. The line card 10 also includes a plurality of data digital signal processors (DDSPs) 40, each associated with one of the subscriber lines 20. The DDSPs 40 are used for establishing and maintaining data transfer sessions on the subscriber lines 20 using known communication protocols, such as T1.413 or G.lite. The functions of the DDSPs 40 for facilitating such data sessions are well known to those of ordinary skill in the art, so they are not described in greater detail herein.

Figure 2:
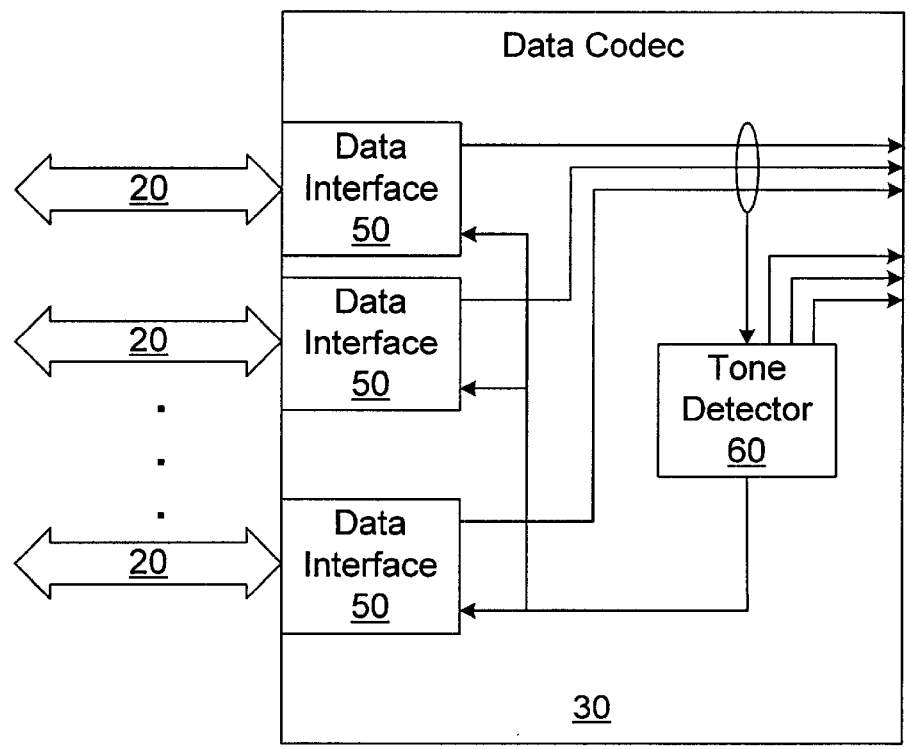
FIG. 2 is a simplified block diagram of a data coder/decoder (codec) of FIG. 1.

Turning now to FIG. 2, a simplified block diagram of the data codec 30 is shown. The data codec 30 includes a data interface 50 and a tone detector 60. The data interface 50 samples the analog subscriber line 20 with which it is associated and provides a digital signal for further processing. The outputs of the data interfaces 50 are received by associated DDSPs 40. The tone detector 60 also monitors selected subscriber lines 20 for the presence of activation tones, such as a T1.413 activation tone, a G.lite activation tone, and a G.lite fast retrain tone. Collectively, these tones are referred to as activation tones.

Figure 3:
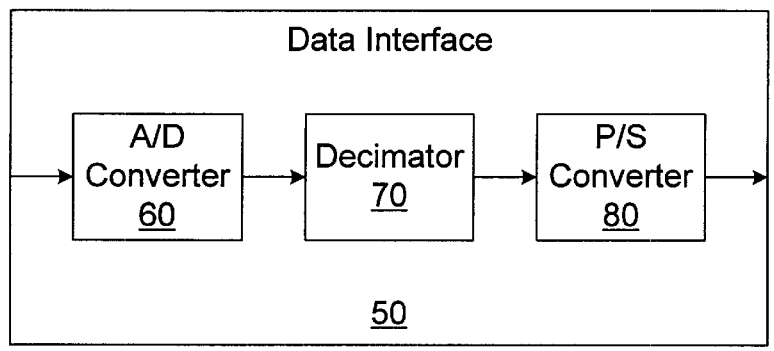
FIG. 3 is a simplified block diagram a data interface in the codec of FIG. 2.

Referring briefly to FIG. 3, a simplified block diagram of the data interface 50 is shown. The data interface 50 includes an analog to digital (A/D) converter 60 for sampling the signal on the subscriber line 20 and generating a digital representation. A decimator 70 reduces the frequency of the digital signal. The A/D converter samples the input signal at approximately 4.416 MHz. The decimator 70 performs a fourth order averaging function to reduce the frequency to approximately 1.104 MHz. A parallel to serial (P/S) converter 80 serializes the output of the decimator 70.

Returning back to FIGS. 1 and 2, the DDSPs 40 accept the serial data for further processing. The tone detector 60 also selects one of the subscriber lines 20 for tone detection. The tone detection process will be described in greater detail below in reference to FIGS. 4–6. The tone detector 60 polls one of the subscriber lines 20 to determine if any activation tones are present. During the polling of a selected subscriber line 20, the tone detector 60 sends a control signal to deactivate the data interfaces 50 not being used (i.e., assuming they are not already maintaining an active data session). This deactivation saves power in the line card 10 and reduces the amount of heat generated. The tone detector 60 also sends disable signals to all of the DDSPs 40 that are not maintaining active data sessions. This further reduces power consumption and heat generation.

When the tone detector 60 detects an activation tone on a particular subscriber line 20, it sends an interrupt to the associated DDSP 40. The tone detector 60 sends different interrupts for each of the activation tones. That is, one interrupt is dedicated to a T1.413 activation tone, one interrupt is dedicated to a G.lite activation tone, and one interrupt is dedicated to a G.lite fast retrain tone. The DDSP 40 receives the interrupt, transitions from the reduced power state, and performs the appropriate tasks in accordance with the communication protocol based on the specific interrupt received. By powering down unnecessary circuitry, the tone detector 60 increases the efficiency and reliability of the line card 10.

Figure 4:
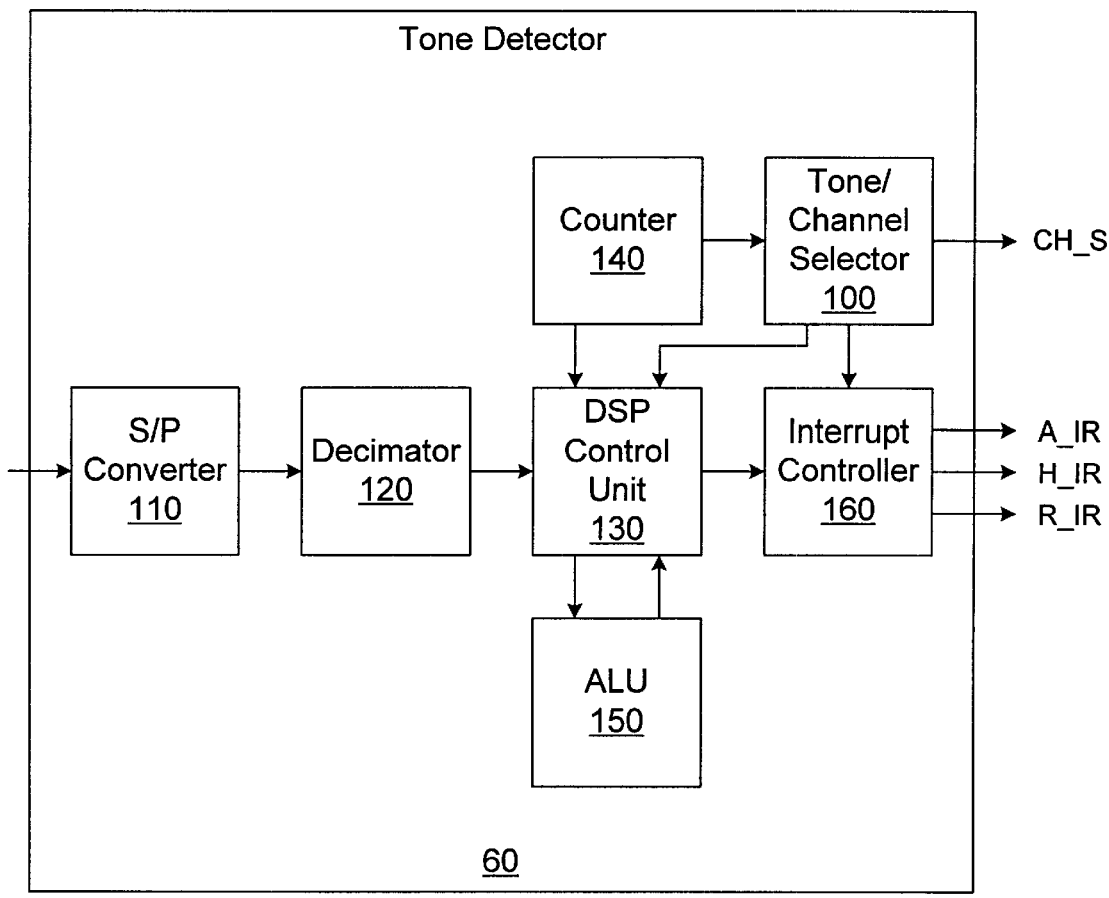
FIG. 4 is a simplified block diagram of a tone detector in the codec of FIG. 2.

Turning now to FIG. 4, a block diagram of the tone detector 60 is provided. The tone detector 60 includes a tone/channel selector 100 for determining which of the subscriber lines 20 to be powered up and polled using a channel select signal (CH_S) for each of the data interfaces 50. The tone detector 60 is coupled to all of the data interfaces 50 in parallel. The CH_S signals place the output buffers of the unselected data interfaces 50 in a high impedance state to prevent them from affecting the input of the tone detector 60, which is driven by the one enabled data interface 50. A serial to parallel (S/P) converter 110 receives the serial output of the enabled data interface 50 and generates a parallel signal. A decimator 120 receives the ~1.1 MHz output of the S/P converter 110 and performs a fourth order averaging function to further reduce the frequency to 276 kHz.

A DSP control unit 130, counter 140, and arithmetic logic unit (ALU) 150 cooperate to perform a series of tone detection functions to detect the presence of any activation tones. The functions performed by the DSP control unit 130, counter 140, and ALU 150, are described in greater detail below in reference to FIG. 5. The DSP control unit 130 interfaces with an interrupt controller 160 to indicate when an activation tone is detected. The interrupt controller 160 provides a T1.413 activation tone interrupt (A_IR) in response to the detection of a T1.413 activation tone, a G.lite activation tone interrupt (H_IR) in response to the detection of a G.lite activation tone, and a G.lite fast retrain tone interrupt (R_IR) in response to the detection of a G.lite fast retrain tone. These interrupts are communicated to the associated DDSP 40 for further action.

Figure 5:
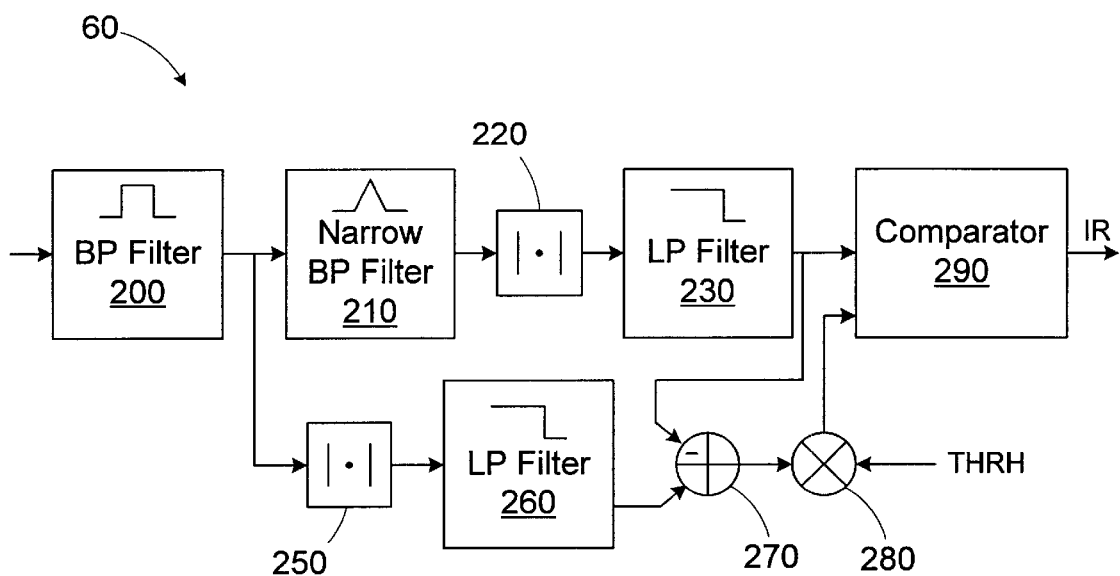
FIG. 5 is a functional block diagram of the tone detector of FIG. 4.

Referring to FIG. 5, a functional block diagram of the tone detector 60 is provided. The functions described are performed by the DSP control unit 130, counter 140, and ALU 150. The tone detector 60 includes various filters used to determine the presence of a tone at a particular frequency. As is well known to those of ordinary skill in the art, the filter coefficients are different depending on the particular frequency and bandwidth desired. The DSP control unit 130 loads the appropriate filter coefficients in sequence to control the particular tone being detected. Determination of the specific coefficients is within the ability of those of ordinary skill in the art. The exemplary filter parameters detailed below are provided for illustrative purposes.

The tone detector 60 includes a band pass filter 200 centered about the target frequency and having a bandwidth of approximately 4.9 kHz. The output of the band pass filter 200 is received by a narrow band pass filter 210 centered about the target frequency and having a bandwidth of about 236 Hz. The output of the narrow BP filter 210 passes through an absolute value unit 220 and to a low pass (LP) filter 230. The cutoff frequency of the LP filter 230 is approximately 741 Hz. The output of the LP filter 230 represents the energy in the signal attributable to a tone at the target frequency.

The output of the band pass filter 200 is also received by an absolute value unit 250 and then by a low pass filter 260. The cutoff frequency of the low pass filter 260 is also approximately 741 Hz. The output of the LP filter 260 represents the total energy in the signal. The signal energy is subtracted from the total energy in a subtractor 270 to generate the noise energy. The noise energy is scaled in a multiplier 280 using a predetermined threshold (THRH). In the illustrated embodiment, the threshold corresponds to a signal to noise ratio of 6 dB. The scaled noise energy (i.e., from the multiplier 280) and the tone energy (i.e., from the LP filter 230) are compared in a comparator 290 to determine the presence of the activation tone being detected. The output of the comparator 290 represents an interrupt signal (JR) to be fed to the interrupt controller 160 of FIG. 4.

The tone detector 60 sequences through each of the tones sequentially. In accordance with industry standards, a T1.413 activation tone is a single tone at frequency bin 8 (i.e., each bin is 4.3125 kHz) with a transmit power of −3.65 dbm for the first 64 symbols (i.e., each symbol=1/4.3125 ms) and 24 db lower for the second 64 symbols. The second 64 symbols are followed by 896 silent symbols. A G.lite activation tone consists of three simultaneous tones at bins 9, 17, and 25 with phase reversals every 16 ms. The G.lite retrain tone is a single tone at bin 20 with phase reversals every 16 ms. There are five steps in the tone detection sequence used by the tone detector 60, one for the T1.413 activation tone, three for the G.lite activation tones, and one for the G.lite fast retrain tone. As stated above the DSP control unit 130 changes the filter coefficients for each step in the tone detection sequence based on the particular tone being detected.

The tone detector 60 parameters are selected to provide the time required to detect the activation tones. The following list provides a sample of these considerations. The digital filters used by the tone detector 60 in the illustrated embodiment require a minimum settling time of 6 ms. Accordingly, the minimum sampling time, T0, should be greater than or equal to 6 ms. The tone detection time should also be an integer multiple of the sampling period (i.e., T0=N/276,000, where N is a positive integer). The channel sampling period, T1, should be a non-integer multiple of 16 ms (i.e., the time between phase reversals on the G.lite tones) to prevent synchronization of the sampling period with the phase reversals. Because there are five tones and eight channels, the channel sampling period should be 40*T0.

Figure 6:
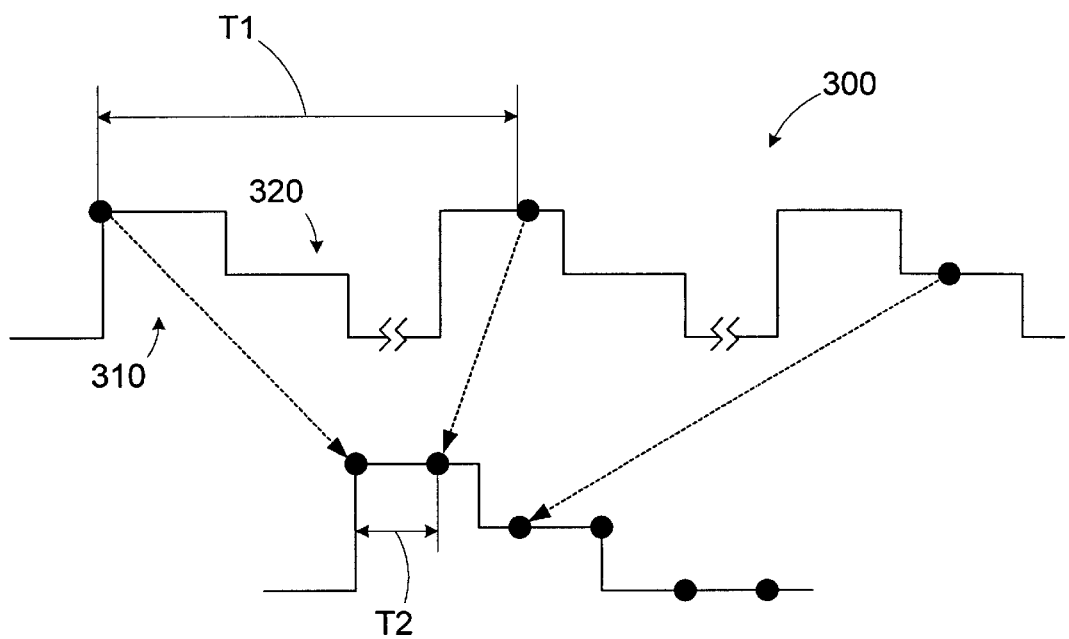
FIG. 6 is a diagram illustrating the sampling used by the tone detector of FIG. 4 used to detect a T1.413 activation tone.

A timing diagram illustrating the detection of the T1.413 activation tone 300 is shown in FIG. 6. To detect points in the higher gain region 310 and the lower gain region 320, each channel should be sampled at time points, T2, that are less than 10 ms. This is accomplished by undersampling the channels. Because the T1.413 activation tone has a cycle of 237.45 ms, the channel sampling period, T1, should be the largest number less than 237.45 ms +10 ms, or 247.45 ms. The conditions described above can be satisfied by finding a sample size, N, where T0 (N/276)>6, and T1 (40*T0) <247.5.

A sample size of N=1707 meets these criteria. Accordingly, the minimum sampling time, T0, is 6.1848 ms, the channel sampling period, T1, is 247.39 ms, and the apparent time between undersampled points, T2, is 9.942 ms. Based on the timing parameters described above, the minimum detection time for any tone is 6.1848 ms, the maximum detection time for a G.lite tone is 247.39 ms, and the maximum detection time for a T1.413 tone is 5.91 s (i.e., 237.45/T2*T1).

The sampling arrangement allows the tone detector 60 to detect all of the activation tones without changing sampling frequencies or sample sizes. Only the filter coefficients need be changed for each stage in the detection process. This simplifies the design of the tone detector 60.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A line card for interfacing with a plurality of subscriber lines, comprising:

a plurality of data processors, each of the data processors being associated with one of the subscriber lines; and a tone detector adapted to detect one of a plurality of activation tones on a selected subscriber line, the plurality of activation tones including:

a first activation tone having an active portion and a silent portion, the active and silent portions repeating periodically at a first frequency having a first period; and a second activation tone having a phase reversal portion repeating at a second frequency having a second period;

the tone detector being further adapted to sequence between the subscriber lines at a predetermined interval, the predetermined interval being based on the first and second periods, and signal the data processor associated with the selected subscriber line in response to detecting one of the activation tones.

2. The line card of claim 1, further comprising a data codec, the tone detector residing on the data codec.

3. The line card of claim 2, wherein the data codec includes a plurality of data interfaces, each of the data interfaces being associated with one of the subscriber lines and being adapted to sample an analog signal present on its associated subscriber line and generate a digital signal based thereon.

4. The line card of claim 3, wherein the tone detector is adapted to access the data interfaces sequentially.

5. The line card of claim 1, wherein the activation tones comprises at least one of a T1.413 activation tone, a G.lite activation tone, and a G.lite fast retrain tone.

6. The line card of claim 1, wherein the tone detector comprises:
   a first filter adapted to determine an activation tone energy;
   a second filter adapted to determine a noise energy; and
   a comparator adapted to compare the activation tone energy and the noise energy and generate a detection signal in response to the activation tone energy exceeding the noise energy by a predetermined threshold.

7. The line card of claim 3, wherein the tone detector is adapted to process a predetermined number of samples from a selected data interface to detect one of the first and second activation tones.

8. The line card of claim 7, wherein the predetermined number of samples is based on the first and second periods.

9. The line card of claim 7, wherein the predetermined number of samples is between 1600 and 1800.

10. The line card of claim 1, wherein the predetermined interval is based on the first period plus a predetermined offset.

11. The line card of claim 1, wherein the predetermined interval is about 247 ms.

12. The line card of claim 10, wherein the predetermined offset is about 10 ms.

13. A method for detecting activation tones on a plurality of subscriber lines, comprising:
   providing a plurality of data processors, each of the data processors being associated with one of the subscriber lines;
   detecting one of a plurality of activation tones on a selected subscriber line, the plurality of activation tones including:
      a first activation tone having an active portion and a silent portion, the active and silent portions repeating periodically at a first frequency having a first period; and
      a second activation tone having a phase reversal portion repeating at a second frequency having a second period;
   sequencing between the subscriber lines at a predetermined interval, the predetermined interval being based on the first and second periods; and
   signaling the data processor associated with the selected subscriber line in response to detecting one of the activation tones.

14. The method of claim 13, further comprising:
   providing a plurality of data interfaces, each data interface being associated with one of the subscriber lines; and
   sampling an analog signal present on a selected subscriber line with the associated data interface and generating a digital signal based thereon.

15. The method of claim 14, further comprising enabling the data interfaces sequentially.

16. The method of claim 13, wherein detecting the activation tone comprises detecting at least one of a T1.413 activation tone, a G.lite activation tone, and a G.lite fast retrain tone.

17. The method of claim 13, wherein detecting one of the plurality of activation tones includes:
   filtering an input signal to determine an activation tone energy;
   filtering the input signal to determine a noise energy; and
   comparing the activation tone energy and the noise energy; and
   generating a detection signal in response to the activation tone energy exceeding the noise energy by a predetermined threshold.

18. The method of claim 14, further comprising processing a predetermined number of samples from a selected data interface to detect one of the first and second activation tones.

19. The method of claim 18, further comprising determining the predetermined number of samples based on the first and second periods.

20. The method of claim 18, wherein processing the predetermined number of samples includes processing between about 1600 and 1800 samples.

21. The method of claim 13, wherein determining the predetermined interval includes setting the predetermined interval at about 247 ms.

22. The method of claim 13, further comprising determining the predetermined interval based on the first period plus a predetermined offset.

23. The method of claim 22, wherein determining the predetermined interval includes setting the predetermined offset to about 10 ms.

24. A line card for detecting activation tones on a plurality of subscriber lines, comprising:
   a plurality of data processors, each of the data processors being associated with one of the subscriber lines; and
   means for detecting one of a plurality of activation tones on a selected subscriber line, the plurality of activation tones including:
      a first activation tone having an active portion and a silent portion, the active and silent portions repeating periodically at a first frequency having a first period; and
      a second activation tone having a phase reversal portion repeating at a second frequency having a second period;
   means for sequencing between the subscriber lines at a predetermined interval, the predetermined interval being based on the first and second periods; and
   means for signaling the data processor associated with the selected subscriber line in response to detecting one of the activation tones.

* * * * *